US008353428B2

(12) United States Patent
Pritchard

(10) Patent No.: US 8,353,428 B2
(45) Date of Patent: Jan. 15, 2013

(54) VOLUMETRIC METERING FITMENT AND PACKAGE INCLUDING THE SAME

(75) Inventor: Barry Pritchard, Nazareth, PA (US)

(73) Assignee: Fres-co System USA, Inc., Telford, PA (US)

( * ) Notice: Subject to any disclaimer, the term of this patent is extended or adjusted under 35 U.S.C. 154(b) by 564 days.

(21) Appl. No.: 12/506,729

(22) Filed: Jul. 21, 2009

(65) Prior Publication Data

US 2011/0017774 A1    Jan. 27, 2011

(51) Int. Cl.
B67D 1/00    (2006.01)
(52) U.S. Cl. .............................. 222/82; 222/105; 222/207
(58) Field of Classification Search .................. 222/105, 222/82, 207, 490, 491, 494
See application file for complete search history.

(56) References Cited

U.S. PATENT DOCUMENTS

| 2,772,817 | A |   | 12/1956 | Jauch |
| 3,220,611 | A | * | 11/1965 | Zander et al. .................... 222/95 |
| 3,696,969 | A |   | 10/1972 | De Van et al. |
| 4,314,654 | A |   | 2/1982 | Gaubert |
| 4,416,395 | A |   | 11/1983 | Gaubert |
| 4,429,810 | A |   | 2/1984 | Hampel et al. |
| 4,440,316 | A | * | 4/1984 | Christine ..................... 222/83.5 |
| 4,452,378 | A |   | 6/1984 | Christine |
| 4,576,313 | A |   | 3/1986 | Smith et al. |
| 4,602,725 | A |   | 7/1986 | Malpas et al. |
| 4,706,827 | A | * | 11/1987 | Cabernoch et al. .......... 215/11.3 |
| 4,875,603 | A | * | 10/1989 | Weinstein ..................... 222/205 |
| 5,337,775 | A | * | 8/1994 | Lane et al. ................. 137/68.29 |
| 5,497,909 | A | * | 3/1996 | Wirsig et al. ..................... 222/82 |
| 5,730,327 | A | * | 3/1998 | Stern .............................. 222/82 |
| 5,819,986 | A |   | 10/1998 | Last et al. |
| 5,875,936 | A | * | 3/1999 | Turbett et al. ................ 222/207 |
| 5,971,207 | A | * | 10/1999 | McDonough et al. ............ 222/1 |
| 6,053,360 | A | * | 4/2000 | Rutter ............................... 222/1 |
| 6,082,584 | A | * | 7/2000 | Stern .............................. 222/83 |
| 6,131,767 | A |   | 10/2000 | Savage et al. |

(Continued)

FOREIGN PATENT DOCUMENTS

EP    1 918 683 A1    5/2008

OTHER PUBLICATIONS

European Search Report for European Application No. 10007411.1-2316 dated Dec. 15, 2010.

*Primary Examiner* — Kevin P Shaver
*Assistant Examiner* — Donnell Long
(74) *Attorney, Agent, or Firm* — Caesar, Rivise, Bernstein, Cohen & Pokotilow, Ltd.

(57) ABSTRACT

A package including a fitment for holding a liquid therein to dispense the liquid and the fitment itself. The fitment is a metering dispensing valve arranged to be secured to a flexible bag for selectively dispensing a metered quantity of the liquid therefrom. It includes a piercing member for piercing through the bag to provide access to the interior of the bag and a compressible bulb having a reservoir in it. The dispensing valve also includes an inlet valve to the reservoir and an outlet valve from the reservoir. The bulb is arranged to be compressed and then released to enable a metered amount of the liquid to be drawn into a reservoir. The bulb can then be compressed again to dispense the metered amount of liquid from the reservoir through the outlet valve to the outlet.

18 Claims, 4 Drawing Sheets

U.S. PATENT DOCUMENTS

| | | | |
|---|---|---|---|
| 6,446,845 B1 | 9/2002 | Steiger | |
| 6,644,510 B2 * | 11/2003 | Kawolics et al. | 222/105 |
| RE39,520 E * | 3/2007 | Hess et al. | 222/92 |
| 7,278,553 B2 * | 10/2007 | Py et al. | 222/207 |
| 7,708,164 B2 * | 5/2010 | Pritchard | 222/81 |
| 7,789,269 B2 * | 9/2010 | Pritchard | 222/81 |
| 7,806,301 B1 * | 10/2010 | Ciavarella et al. | 222/207 |
| 7,980,424 B2 * | 7/2011 | Johnson | 222/83 |
| 7,997,462 B2 * | 8/2011 | Erb | 222/567 |
| 2005/0121464 A1 | 6/2005 | Miller et al. | |
| 2007/0080177 A1 * | 4/2007 | Hatton et al. | 222/207 |
| 2007/0157991 A1 * | 7/2007 | Robertson | 141/360 |
| 2007/0295753 A1 * | 12/2007 | Vangeel et al. | 222/163 |
| 2008/0135577 A1 * | 6/2008 | Erb | 222/105 |

* cited by examiner ic # VOLUMETRIC METERING FITMENT AND PACKAGE INCLUDING THE SAME

CROSS-REFERENCE TO RELATED APPLICATIONS

"Not Applicable"

STATEMENT REGARDING FEDERALLY SPONSORED RESEARCH OR DEVELOPMENT

"Not Applicable"

INCORPORATION-BY-REFERENCE OF MATERIAL SUBMITTED ON A COMPACT DISK

"Not Applicable"

BACKGROUND OF THE INVENTION

1. Field of Invention

This invention relates generally to flexible packages and more particularly to flexible packages including a fitment for dispensing a metered amount of liquid within the packages.

2. Description of Related Art

Numerous patents disclose flexible packing for holding liquids and for dispensing the liquid through a fitment outlet or tap forming a portion of the package. See for example, U.S. Pat. No. 4,429,810 (Hample et al.), U.S. Pat. No. 3,696,969 (De Van et al.), U.S. Pat. No. 4,314,654 (Gaubert), U.S. Pat. No. 4,416,395 (Gaubert), U.S. Pat. No. 4,452,378 (Christine), U.S. Pat. No. 4,602,725 (Malpas et al.), U.S. Pat. No. 6,131,767 (Savage et al.), U.S. Pat. No. 6,446,845 (Steiger) and published application 2005/0121464A1.

The devices of the above identified prior art make use of gravity to enable the liquid within the flexible package to be dispensed from the package. As will be appreciated by those skilled in the art, when the contents of the flexible package has reached a very low level there may not be sufficient static head to enable the dispensing of further amounts, thereby leaving some liquid still within the package. Moreover, the dispensing packages of the prior art making use of gravity as the mechanism for effecting the dispensing operation may not provide precise and repeatable metering of the liquid being dispensed.

Flexible packages for use with pumps also exist in the prior art. See for example, U.S. Pat. No. 4,576,313 (Smith et al.), U.S. Pat. No. 5,819,986 (Last et al.) and U.S. Pat. No. 6,082,584 (Stern).

While the aforementioned packages with fitments may be generally suitable for their intended purposes, they suffer from one or more of the drawbacks, e.g., simplicity of construction, low cost, effectiveness in dispensing repeated metered amounts of liquid, and effectiveness dispensing the entire contents of the package.

In my co-pending U.S. patent application Ser. No. 11/609,064, filed on Dec. 11, 2006, entitled Volumetric Dispensing Fitment And Package Including The Same, which is assigned to the same assignee as this invention and whose disclosure is incorporated by reference herein there is disclosed and claimed a metering dispensing valve fitment for package holding a liquid and a package including such a fitment which overcomes many of the disadvantages of the prior art. That fitment is arranged to be secured to a flexible bag for selectively dispensing a metered quantity of the liquid from the bag. The fitment includes a compressible bulb and a piercing member coupled to the bulb so that when the bulb is compressed the piercing member pierces through the bag to enable a metered amount of the liquid to be drawn into a reservoir in the bulb when the bulb is released. The bulb can then be recompressed to dispense the metered amount of liquid from the reservoir. The dispensing valve also includes an inlet valve to the reservoir and an outlet valve from the reservoir. The fitment may include a pair of barriers to enable it to be sterilized before being secured to the bag to form an aseptic package.

While the fitment of my aforementioned application is suitable for its intended purposes, for some applications a simpler configuration may be desirable. The subject invention addresses that need.

SUMMARY OF THE INVENTION

This invention relates to a package including a metering valve fitment for holding a liquid therein to dispense the liquid and the fitment itself. The metering valve fitment is arranged for selectively dispensing a metered quantity of the liquid from the package. The package comprises a flexible bag having a wall. The metering valve fitment has a body, a fluid inlet check valve, a fluid outlet check valve, a compressible bulb, a piercing element and an outlet. The compressible bulb defines a collapsible reservoir into which a portion of the liquid from the package is transferred for dispensing. The inlet valve is arranged to isolate the reservoir from the package. The outlet valve is arranged to isolate the reservoir from the outlet. The piercing element is arranged to be brought into engagement with a portion of the wall of the package to pierce the wall of the package. The bulb is arranged to be compressed and then released after the wall of the package has been pierced, whereupon the inlet valve is automatically opened and the outlet valve is automatically closed and a metered amount of the liquid is drawn into the reservoir. The metering valve fitment is further arranged so that when the bulb is compressed after the liquid is drawn into the reservoir the outlet valve is automatically opened to dispense a metered amount of the liquid through the outlet.

In accordance, with one preferred aspect of this invention the wall of the package includes another fitment and wherein the piercing member comprises a bayonet arranged to be releasably received in the other fitment when the piercing member has pierced the wall of the package.

DETAILED DESCRIPTION OF THE PREFERRED EMBODIMENT

Figure 1:
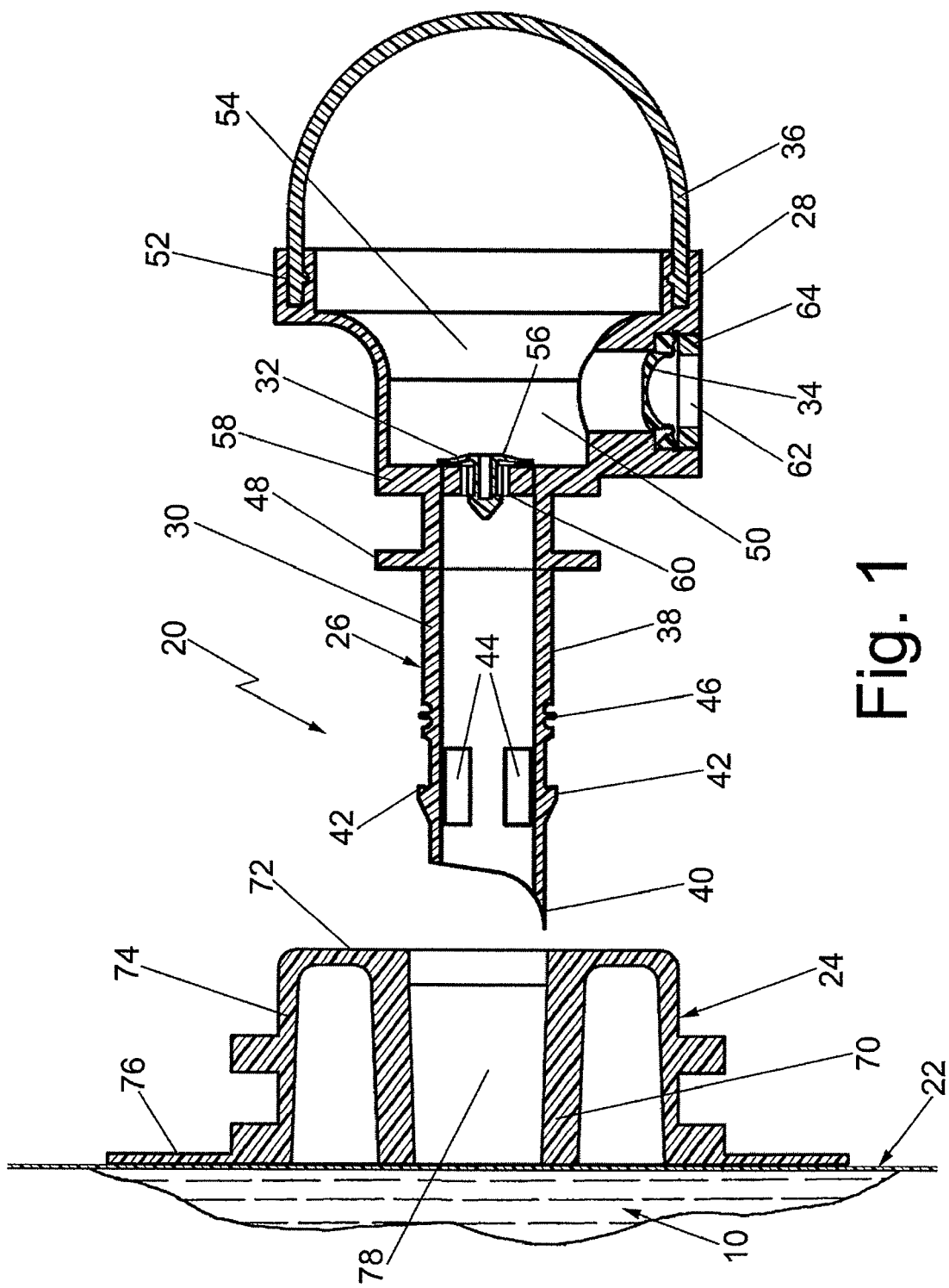
FIG. 1 is an exploded sectional view of an exemplary package constructed in accordance with one exemplary embodiment of this invention, shown just before the metering valve fitment of this invention is secured to the package.

Referring now to the various figures of the drawing wherein like reference characters refer to like parts, there is shown at 20 in FIG. 1 one exemplary embodiment of a disposable package 20 for holding and dispensing a liquid 10, e.g., coffee creamer. The package 20 is in the form of a flexible bag or pouch 22 including a fitment 24 to which a metering valve fitment 26 will be secured. The metering valve fitment 26 is constructed in accordance with this invention and serves to meter a predetermined quantity of the liquid 10 from the bag 22 into it and to dispense that metered quantity of liquid out of it when desired. The flexible package can be of any conventional construction, e.g., formed of a polymeric film of one or more layers.

The metering valve fitment 26 basically comprises a body 28 including a piercing member 30, a fluid inlet check valve 32, a fluid outlet check valve 34, and a compressible bulb 36. The piercing member 30 is in the form of a bayonet-like member that comprises a hollow tubular side wall 38 whose distal end is sharpened to form a piercing tip 40. A plurality of cam-surface detents 42 are equidistantly spaced about the periphery of the outer surface of the tubular side wall 38 proximally of the tip 40. A plurality of equidistantly spaced openings or windows 44 extend through the side wall 38. The windows 44 serve as inlet ports for the liquid 10 within the bag 20 to flow into the metering valve fitment 26 (as will be described later).

The outer diameter of the side wall 38 of the piercing member is just slightly smaller than the inside diameter of a passageway 78 (to be described later) in the other fitment 24. In order to provide a fluid-tight seal between the inner surface of the passageway 78 of the fitment 24 and the outer surface of the side wall 38 of the piercing member 30 when the two fitments are secured together, the side wall of the piercing member 30 includes a sealing gasket. The gasket is in the form of an integral narrow, low-height annular flange 46, whose outer diameter is just slightly larger than the peripheral portion of the passageway 78 of the fitment 24 at which it will be located when the two fitments are secured together. Another, and significantly larger, circular flange 48 extends about a proximal portion of the side wall 38 of the piercing member 30. The flange 48 serves as a stop when the fitment 26 is secured to fitment 24, as will be described later.

The proximal portion of the body 28 of the metering valve fitment is of considerably larger diameter than the piercing member 30 and includes a somewhat flared interior chamber 50. The proximal end of the body is in the form of an annular recess 52 for mounting the bulb 36. The bulb 36 is a compressible, hollow, dome-shaped (e.g., hemispherical) member whose peripheral edge or rim is fixedly secured within the annular recess 52. The bulb 36 is formed of a resilient member material, e.g., rubber, and naturally assumes the dome shape shown in FIGS. 1-3. The hollow interior of the bulb 36 is in communication with the interior chamber 50 of the body to collectively form a reservoir 54 into which a metered amount of liquid 10 from the bag 22 is transferred for subsequent dispensing. The transfer action will be described in detail later. Suffice for now to state that it is accomplished by compressing and releasing the bulb to fill the reservoir and then compressing the bulb again to dispense the metered amount of liquid. The volumetric capacity of the reservoir 54 is a matter of choice, depending upon the liquid to be dispensed. For example, for applications wherein the bag 22 contains a liquid coffee creamer, the reservoir has a capacity of approximately 0.5 oz. since that is a typical amount of creamer used for a cup of coffee.

The inlet to the reservoir 54 is provided by the fluid inlet check valve 32. The valve 32 basically comprises an umbrella-shaped resilient member 56 that is mounted within a central hole in a wall 58 of the body 28 at the base of the chamber 50. The portion of the wall 58 underlying the peripheral portion of the umbrella 56 forms the seat of the inlet valve 32. A plurality of equidistantly spaced apertures 60 extend through the valve seat under the umbrella 56. When the umbrella is in its normal, un-flexed state, like shown in FIGS. 1, 2 and 4, the peripheral portion of the umbrella overlies the apertures 60 to seal them off, thereby closing the inlet valve, i.e., isolating the reservoir 54 from the interior of the piercing member 30.

Figure 4:
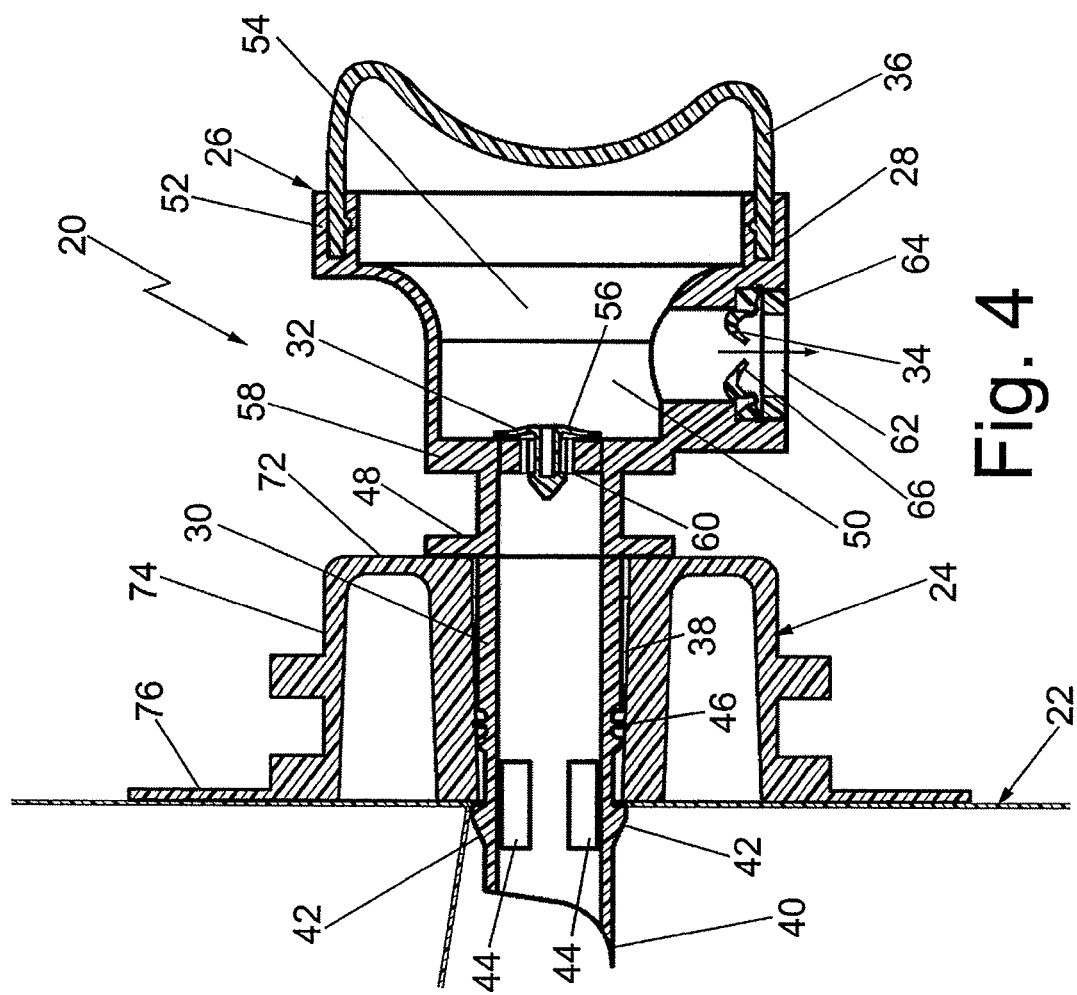
FIG. 4 is a section view, similar to FIGS. 2 and 3, but showing the metering fitment in the process of dispensing the metered amount of liquid from the fitment.

The outlet of the fitment 26 is in the form of a port 62 in the body 28. The port 62 can be thought of as the spout of the fitment and is the point at which the liquid from the bag is dispensed. The outlet check valve 34 is disposed at the port 62 and is held in place by a retaining ring 64. The outlet check valve basically comprises a resilient, dome-shaped member having a peripheral flange which abuts the retaining ring 64. The dome portion of the valve 34 includes a pair of crossing slits to form an X-shaped cut (not shown). The portions 66 of the valve 34 contiguous with the X-shaped cut are arranged to flex downward, i.e., in the direction of the outlet, when pressure is applied above the valve, such as shown in FIG. 4. Such pressure occurs when the bulb 36 is depressed with liquid in the reservoir, as will be described later.

Referring now to FIG. 1, the fitment 24 that is fixedly secured to the bag 22 will now be described. The fitment 24 basically comprises an integral, annular body having an inner wall portion 70, a front wall portion 72, an outer wall portion 74 and a peripheral flange 76. The fitment 24 can be formed of any suitable material, e.g., any suitable plastic. The peripheral flange 76 is arranged to be fixedly secured, e.g., welded, to the wall of the bag 22 in which the liquid 10 to be dispensed is located. The inner wall portion 70 of the fitment 26 defines the heretofore identified passageway 78. That passageway is a slightly tapering central passageway which is shaped to closely receive and accommodate the piercing member 30 of the fitment 26 when the fitment 26 is secured to the fitment 24. When the fitment 24 is secured to the outer surface of a wall of the bag as shown in FIG. 1, the passageway 78 in the fitment 24 is closed off by the portion of the wall of the bag overlying the inner end of the passageway, whereupon liquid 10 in the bag is isolated from the passageway 78 by that wall portion of the bag.

When it is desired to dispense a metered amount of the liquid 10 from a filled bag 22 having a fitment 24 secured thereto, such as shown in FIG. 1, the user takes the fitment 26 and orients it like shown in FIG. 1 to juxtapose the piercing end 40 opposite and aligned with the open end of passageway 78 in the fitment 24. The fitment 26 is then moved so that the piercing member 30 enters and passes down the passageway 78 until its piercing tip 40 engages the wall portion of the bag bounded by the passageway. Continued pressure on the fitment in that direction causes the piercing tip to pierce through the bag's wall as shown clearly in FIG. 2.

Figure 2:
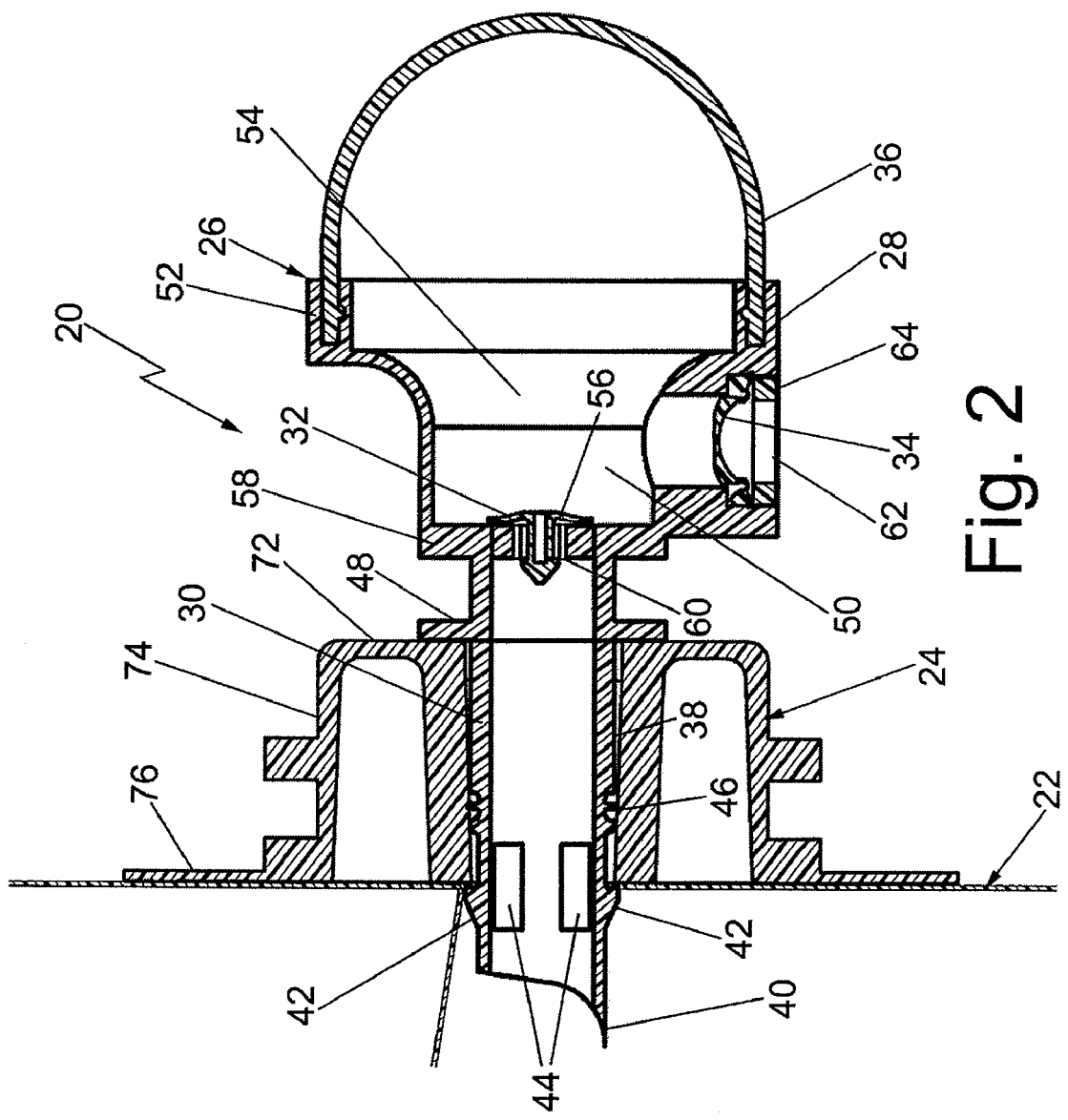
FIG. 2 is a sectional view of the package of FIG. 1, but after the metering valve fitment has been secured to the package to provide access to the liquid located within the package, but prior to any metered dispensing of that liquid.

The components of the two fitments are of an appropriate size and shape so that when the stop flange 48 of the fitment 26 abuts the front wall 72 of the fitment 24, the detents 42 on the piercing member 30 will have passed through the wall of the bag 22 and will be abutting the inner surface of the bag contiguous with the inner edge of the mounting flange 76 as shown in FIG. 2. This action locks the fitment 26 to the fitment 24, with the interior of the bag 10 in fluid communication with the interior of the piercing member 30 via the open end of the piercing member 30 and the windows 44. Accordingly, liquid 10 within the bag can flow into the hollow interior of the piercing member, but cannot gain ingress into the reservoir 54, since the inlet check valve 32 is closed.

Figure 3:
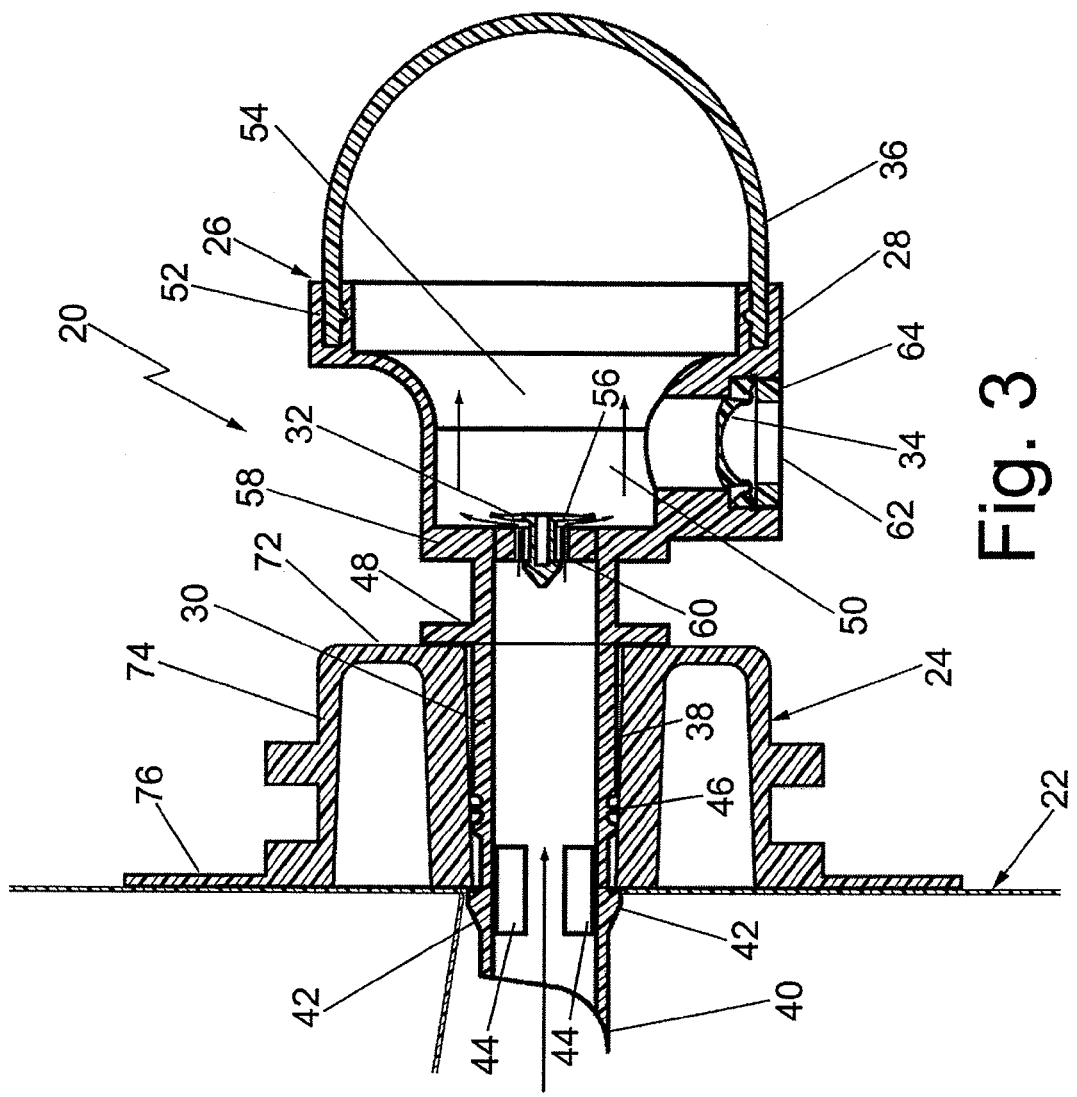
FIG. 3 is a section view, similar to FIG. 2, but showing the metering valve fitment in the process of withdrawing liquid from the package into the interior of the metering valve fitment for subsequent dispensing therefrom.

The package is now ready to be used to dispense a metered amount of liquid from it. To that end, in order to charge or load the reservoir with the metered amount of liquid, the user merely presses on the distal end of the bulb 36 to compress the bulb (like shown in FIG. 4) and then releases the bulb, whereupon the bulb naturally assumes its shape as shown in FIG. 3. This action creates a vacuum on the umbrella portion 56 of inlet valve to cause it flex upward off of the valve seat, whereupon the liquid 10 within the piercing member 30 is drawn through the inlet check valve's apertures 60 (as shown by the arrows in FIG. 3) into the reservoir 54. When the bulb 36 has moved back to its natural, unbiased state, the umbrella valve 56 will have also moved back (assumed) to its natural unbiased state, i.e., the state shown in FIG. 1, thereby closing off the apertures 60. The liquid transferred into the reservoir (the metered amount of liquid) is at this time isolated from the outlet 62, i.e., prevented from getting out, by the closed outlet check valve 34.

Dispensing of the metered amount of liquid from the reservoir 54 can be readily accomplished by depressing (compressing) the bulb 36 again as shown in FIG. 4. Since the liquid within the reservoir is incompressible the action of depressing the bulb causes the liquid in the reservoir to bear against the dome shaped outlet valve 34, whereupon the portions 66 of that valve contiguous with its X-shaped slit flex as shown in FIG. 4, thereby providing a passageway for the liquid to pass through the valve to the outlet port, e.g., a metered quantity of coffee creamer can be dispensed into a cup of coffee (not shown) located below the outlet (spout).

It should be pointed out at this juncture that the size (capacity) and shape of the bulb and its reservoir is a matter of design choice. Thus, the valve of this invention can be constructed to dispense quantities of fluid in amounts other than 0.5 oz.

If desired the fitment 34 can be constructed so that its interior is maintained in an aseptic condition prior to its securement to the fitment 24 on the bag 22. To that end, a barrier member, e.g., a cap can be releasably secured over the end 40 of the piercing member 30, while another barrier member, e.g., film membrane, can be releasably secured to the outlet 62, e.g., heat sealed to the periphery of the outlet or may be molded in place, e.g., molded in-situ. In any case, with the inlet and outlet barriers in place, the fitment 26 is sealed, i.e., its interior surfaces are isolated from the ambient atmosphere. In this state the fitment 26 can be irradiated, e.g., exposed to ionizing radiation to render all of its internal surfaces sterile. The sterile fitment 26 can then be used to fixedly secure it to a bag 22 for applications wherein the bag will be holding contents requiring an aseptic package, e.g., flowable foodstuffs, etc.

Use of the aseptic fitment 26 to dispense liquid from the package is accomplished in the same manner as described above, except that the inlet cap must be removed before securement to the fitment 24 and the outlet membrane must be removed to uncover the fitment's outlet to enable liquid to be dispensed.

While the invention has been described in detail and with reference to specific examples thereof, it will be apparent to one skilled in the art that various changes and modifications can be made therein without departing from the spirit and scope thereof.

What is claimed is:

1. A metering valve fitment for a package holding a liquid therein, said fitment being arranged for selectively dispensing a metered quantity of the liquid from the package, the package comprising a flexible bag having a wall and another fitment, the other fitment including a passageway extending directly to a portion of the wall of the bag, said metering valve fitment having a body, a fluid inlet check valve, a fluid outlet check valve, a compressible bulb, a tubular piercing element and an outlet, said compressible bulb defining a collapsible reservoir into which a portion of the liquid from the package is transferred for dispensing, said fluid inlet check valve being arranged to isolate said reservoir from said tubular piercing element, said fluid outlet check valve being arranged to isolate said reservoir from said outlet, said tubular piercing element being arranged to be extended through the passageway in the other fitment and brought into direct engagement with the portion of the wall of the bag to directly pierce the wall of the bag, said bulb being arranged to be compressed and then released after the wall of the bag has been pierced, whereupon said fluid inlet check valve is automatically opened and said fluid outlet check valve is automatically closed and a metered amount of the liquid is drawn through said tubular piercing element and said opened fluid inlet check valve into said reservoir, said metering valve being further arranged so that when said bulb is compressed after the liquid is drawn into said reservoir said fluid outlet check valve is automatically opened to dispense a metered amount of the liquid through said outlet.

2. The metering valve fitment of claim 1 wherein the other fitment is secured to the wall of the bag and wherein said tubular piercing member comprises a bayonet including a locking member and is arranged to be releasably received in the passageway in the other fitment when said piercing member has pierced the wall of the bag, whereupon said locking member of said bayonet engages a portion of the other fitment to fixedly secure said fitment to the other fitment.

3. The metering valve fitment of claim 1 additionally comprises an inlet barrier and an outlet barrier, said inlet barrier being initially disposed over said inlet and said outlet barrier being initially disposed over said outlet, whereupon the interior of said metering valve fitment is initially sealed and isolated from the ambient atmosphere so that it can be exposed to ionizing radiation to render its internal surfaces sterile, whereupon said metering valve fitment is ready to be secured to the wall of said bag.

4. The metering valve fitment of claim 1 wherein said fluid inlet check valve comprises an umbrella valve element and an associated valve seat having at least one opening therein.

5. The metering valve fitment of claim 4 wherein said umbrella valve element is formed of an elastomeric material.

6. The metering valve fitment of claim 1 wherein said fluid outlet check valve comprises a dome valve element having at least one cut therein.

7. The metering valve fitment of claim 6 wherein said dome valve element is formed of an elastomeric material.

8. The metering valve fitment of claim 6 wherein said at least one cut comprises an X-cut.

9. The metering valve fitment of claim 4 wherein said fluid outlet check valve comprises a dome valve element having at least one cut therein.

10. A package for holding and selectively dispensing a metered quantity of a liquid therefrom, said package comprising a flexible bag and a metering valve fitment, said bag having a hollow interior in which the liquid is located, a wall and another fitment, said other fitment including a passageway extending directly to a portion of said wall of said bag, said metering valve fitment having a body, a fluid inlet check valve, a fluid outlet check valve, a compressible bulb, a tubular piercing element and an outlet, said compressible bulb defining a collapsible reservoir into which a portion of the liquid from said bag can transferred for dispensing, said fluid inlet check valve being arranged to isolate said reservoir from said tubular piercing element, said fluid outlet check valve being arranged to isolate said reservoir from said outlet, said tubular piercing element being arranged to be extended through said passageway in said other fitment and brought into direct engagement with a portion of said wall of said bag to directly pierce said wall of said bag, said bulb being arranged to be compressed and then released after said wall of said bag has been pierced, whereupon said fluid inlet check valve is automatically opened and said fluid outlet check valve is automatically closed and a metered amount of the liquid is drawn through said tubular piercing element and said opened fluid inlet check valve into said reservoir, said metering valve fitment being further arranged so that when said bulb is compressed after the liquid is drawn into said reservoir said fluid outlet check valve is automatically opened to dispense a metered amount of the liquid through said outlet.

11. The package of claim 10 wherein said other fitment is secured to said wall of said bag and wherein said tubular piercing member comprises a bayonet including a locking member and is arranged to be releasably received in said passageway in said other fitment when said piercing member has pierced the wall of said bag, whereupon said locking member of said bayonet engages a portion of said other fitment to fixedly secure said fitment to said other fitment.

12. The package of claim 10 additionally comprises an inlet barrier and an outlet barrier, said inlet barrier being initially disposed over said inlet and said outlet barrier being initially disposed over said outlet.

13. The package of claim 10 wherein said fluid inlet check valve comprises an umbrella valve element and an associated valve seat having at least one opening therein.

14. The package of claim 13 wherein said umbrella valve element is formed of an elastomeric material.

15. The package of claim 10 wherein said fluid outlet check valve comprises a dome valve element having at least one cut therein.

16. The package of claim 15 wherein said dome valve element is formed of an elastomeric material.

17. The package of claim 15 wherein said at least one cut comprises an X-cut.

18. The metering valve fitment of claim 13 wherein said fluid outlet check valve comprises a dome valve element having at least one cut therein.

* * * * *